United States Patent [19]

Gyovai

[11] Patent Number: 5,697,684
[45] Date of Patent: Dec. 16, 1997

[54] STORAGE DEVICE FOR FLAT OBJECTS

[76] Inventor: Geza Gyovai, Höglerstrasse 53, 8600 Dübendorf, Switzerland

[21] Appl. No.: 584,982

[22] Filed: Jan. 11, 1996

[30] Foreign Application Priority Data

Jan. 11, 1995 [CH] Switzerland ............ 00 065/95
Sep. 6, 1995 [CH] Switzerland ............ 02 526/95

[51] Int. Cl.$^6$ ............................................. A47B 81/06
[52] U.S. Cl. ............... 312/9.42; 211/40; 211/168; 312/9.46; 312/9.57
[58] Field of Search .................... 312/9.9, 9.11, 312/9.27, 9.28, 9.42, 9.45, 9.46, 9.48, 9.57, 9.58, 9.63, 324; 211/40, 168, 163; 206/308.1, 309, 310

[56] References Cited

U.S. PATENT DOCUMENTS

| 2,922,527 | 1/1960 | Finn .................................. 211/40 |
| 4,668,027 | 5/1987 | King et al. ................. 206/387.15 X |
| 4,875,743 | 10/1989 | Gelardi et al. ..................... 312/9.42 |
| 4,998,618 | 3/1991 | Borgions ..................... 206/308.1 X |
| 5,099,995 | 3/1992 | Karakane et al. ............... 206/308.1 |
| 5,232,275 | 8/1993 | Yamazoe ................... 312/9.42 X |
| 5,344,028 | 9/1994 | Angele .................... 312/9.58 X |
| 5,524,976 | 6/1996 | Peng ............................ 312/9.46 |

FOREIGN PATENT DOCUMENTS

| U-9107451 | 9/1991 | Germany . |
| U-9320057 | 2/1994 | Germany . |
| U-9401555 | 3/1994 | Germany . |
| U-9404005 | 5/1994 | Germany . |
| U-9412484 | 9/1994 | Germany . |
| 1648755 | 5/1991 | U.S.S.R. ..................... 211/163 |
| A-542411 | 3/1940 | United Kingdom . |

OTHER PUBLICATIONS

IBM Technical Disclosure Bulletin, vol. 26, No. 3A, Aug. 1983, pp. 1208–1209, W.H. Bachman et al., "Magnetic Disk container".

*Primary Examiner*—Peter M. Cuomo
*Assistant Examiner*—Janet M. Wilkens
*Attorney, Agent, or Firm*—Henry M. Feiereisen

[57] ABSTRACT

A storage device for flat objects includes a main body inform of a stack of overlying support members between a base and a cover. Each support member is formed by a tray for storing a flat object and a mounting part secured to the tray and swingably mounted to a vertical rod that extends eccentrically to a center axis of the main body between the cover and the base. Thus, the support members can be swung in substantial horizontal direction between a closed position and an open position in which the tray is accessible for depositing or removing a flat object.

21 Claims, 8 Drawing Sheets

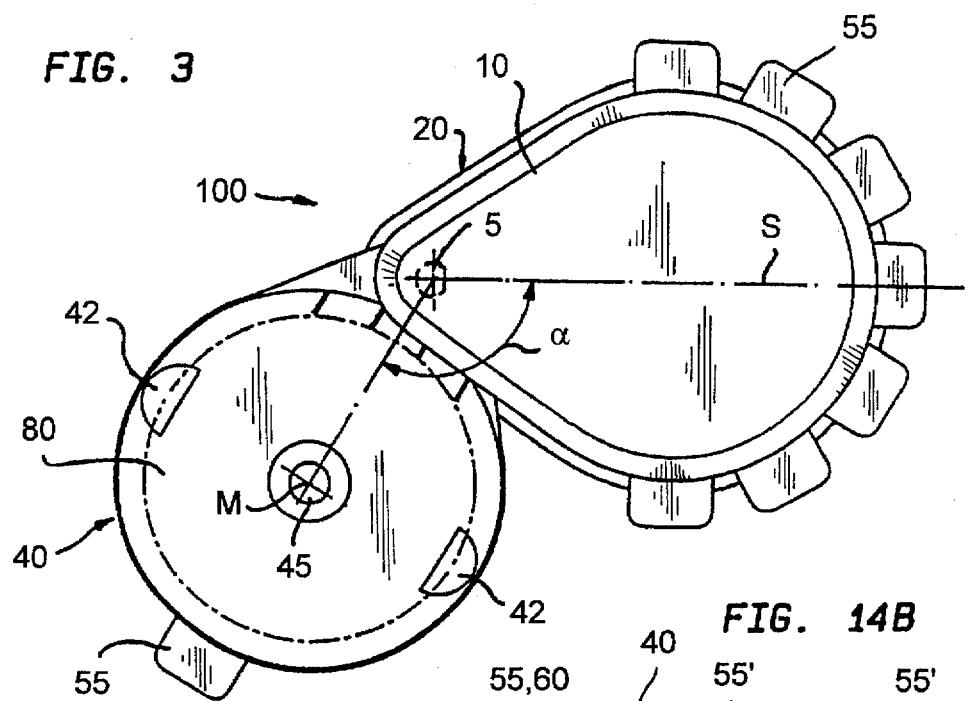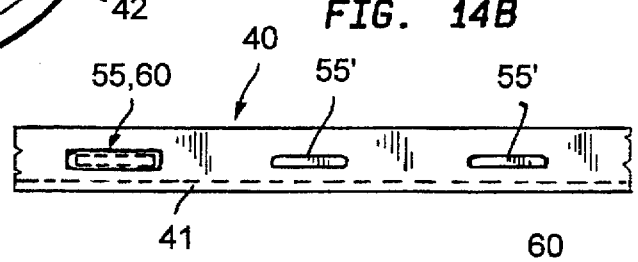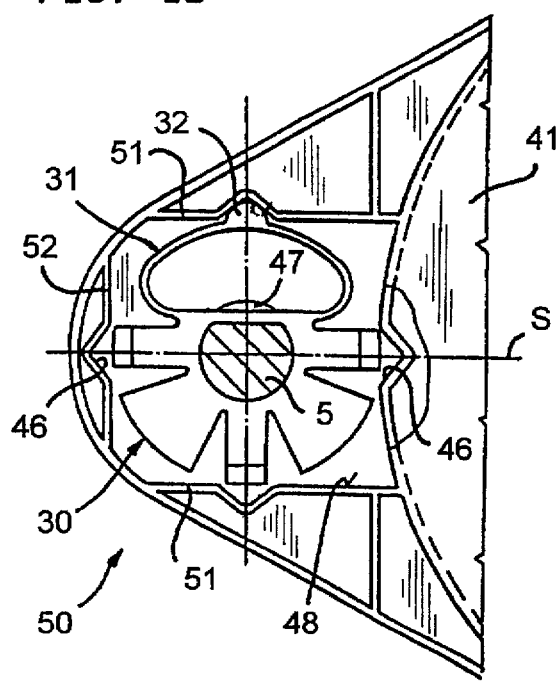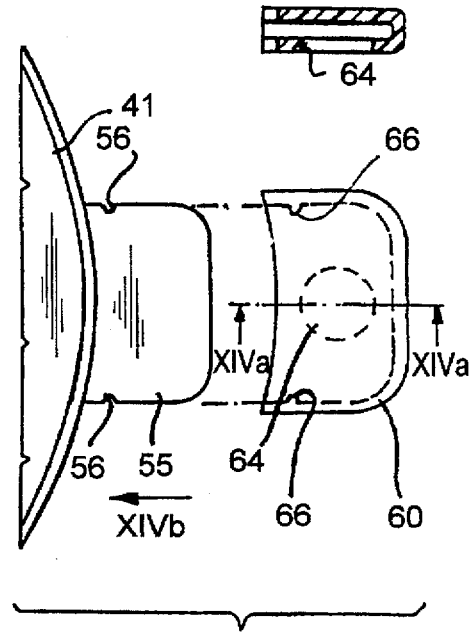

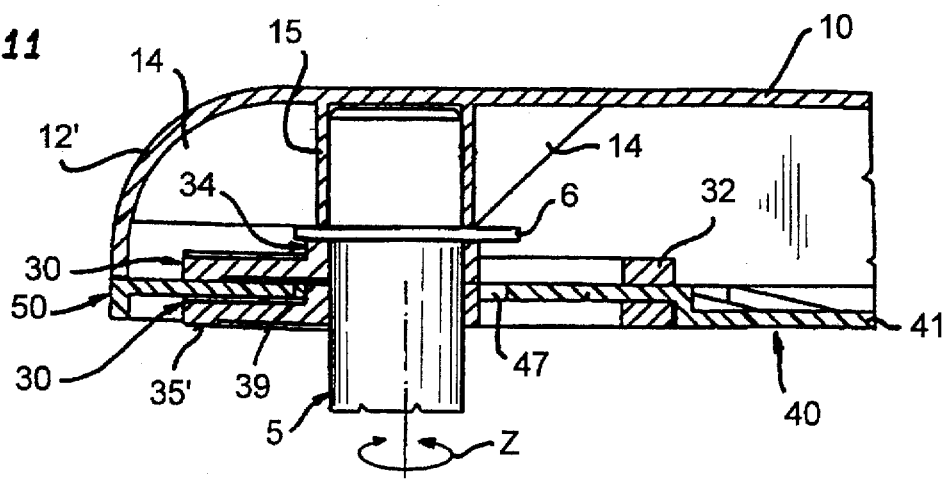
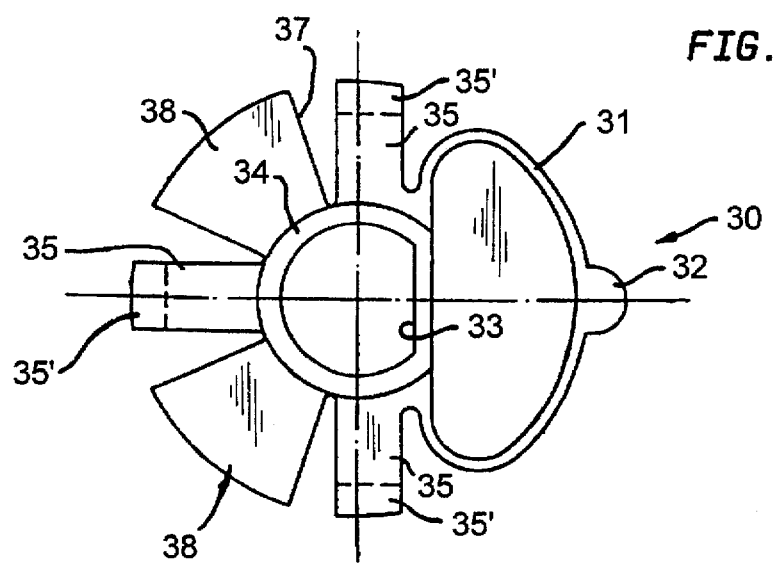
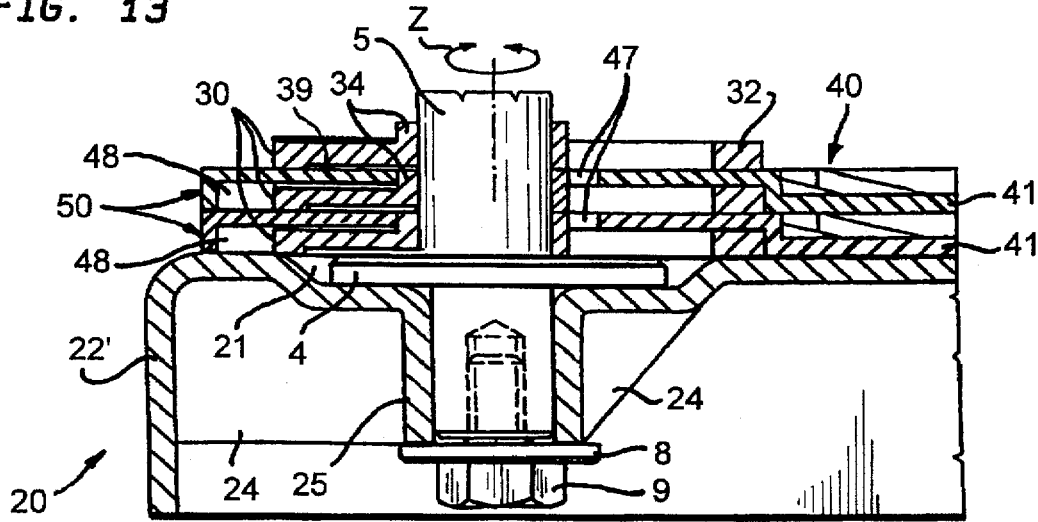

STORAGE DEVICE FOR FLAT OBJECTS

BACKGROUND OF THE INVENTION

The present invention refers to a storage device for relatively flat objects, in particular to a storage rack for storing and/or withdrawing flat-shaped data carriers.

It is generally known to store and protect disc-shaped data carriers such as compact discs in hinged plastic cases in form of an upper cover and a lower cover which are connected together via a joint. These CD cases can then be stored and handled in a CD rack in overlying relationship. Conventional storage racks require however that the individual compact discs are arranged within the rack together with the case so that the rack becomes relatively high when storing a greater number of cases. A conventional CD storage rack for approximately 100 compact discs, including cases, could reach a height of about 1.8 m to 2.0 m. Other assemblies that are not configured in form of a rack, such as e.g. cabinets, are also characterized by relatively great spatial dimensions.

For economical reasons, it is also generally known to package compact discs in disposable cases for distribution, e.g. plastic or carton cases that are relatively simple to recycle.

SUMMARY OF THE INVENTION

It is an object of the present invention to provide an improved storage device, obviating the aforestated drawbacks.

In particular, it is an object of the present invention to provide a storage device of small structural dimensions for storage of a number of data carriers in a dust-free and protected manner while yet ensuring storage and withdrawal of individual data carriers without damaging the highly sensitive data surface.

These objects and others which will become apparent hereinafter are attained in accordance with the present invention by a storage device which is comprised of a main body in form of a stack of overlying support members between a base and a top, with each support member being formed by a tray for storing a flat object and a mounting part secured to the tray and swingably mounted to a vertical rod that extends eccentrically in relation to a center axis of the main body between the top and the base to enable each support member to swing in substantial horizontal direction between a closed position and an open position for placement or withdrawal of a flat object.

Thus, the support members can be pivoted with or without data carriers independently from one another about the vertical rod without necessitating a handling of any of the support members that are situated above or below. Each individual support member can be pivoted about the vertical rod unimpededly about an angle of 360° to position the tray for easy access to the data carrier or for easy placement of the data carrier in the tray. The storage rack is of stable structure so that two or three support members can be swung at a same time.

A storage device according to the invention for storing of e.g. 100 compact discs can exhibit an overall height of about 0.44 m and thus is of reduced dimensions compared to conventional storage racks whereby the base area is only slightly greater than the diameter of a circular storage rack.

The main body is preferably of drop-shaped configuration, with each support member having a tapered transition between the circular tray and the mounting part. The overlying support members of the stack are distanced from each other by disk-shaped spacers which are received in pockets of the underside of the support members and are securely fixed to the rod, with a resilient catch being engageable in a notch of the tray to secure the closed position. Each spacer is preferably made of a hub which is fixedly secured to the rod and connected to a spring element on one side, and with a plurality of circumferentially spaced arms that project radially from the hub. The catch for engagement in the notch of the tray is suitably formed on the spring element. Three of the plurality of arms are spaced from each other by 90° and are formed with an axially projecting nose for effecting a three point bearing upon the mounting part of the subjacent support member. Positioned between the neighboring arms are wing-like members for support of the mounting part of the overlying support member.

Suitably, each support member is formed with a jutting grip portion for facilitating a pivoting of the support member between the closed and open positions.

A storage device according to the present invention can easily be combined with like storage devices and placed upon a common ground plate to form storage rack assemblies that can hold an even greater number of data carriers.

BRIEF DESCRIPTION OF THE DRAWING

The above and other objects, features and advantages of the present invention will now be described in more detail with reference to the accompanying drawing in which:

FIG. 3 is a top view of the storage rack of FIG. 1;

FIG. 11 is a sectional view of the storage rack, showing an enlarged detailed illustration of the circled area marked XI in FIG. 2;

FIG. 12 is a top view of a disk-shaped spacer for use between overlying support members of the storage rack of FIG. 1;

FIG. 13 is a sectional view of the storage rack, showing an enlarged detailed illustration of the circled area marked XIII in FIG. 2;

FIG. 14 is a top view of a plastic cap for placement over a grip portion of the support member according to FIG. 8;

FIG. 14a is a sectional view of the plastic cap taken along the line XIVa—XIVa in FIG. 14;

FIG. 14b shows a fragmentary side elevational view, in direction of arrow XIVb in FIG. 14, of a portion of the tray for enabling a selective disposition of the grip portion;

FIG. 15 is a fragmentary bottom view of a modification of a support member of the storage rack according to the present invention;

DETAILED DESCRIPTION OF PREFERRED EMBODIMENTS

Figure 1:
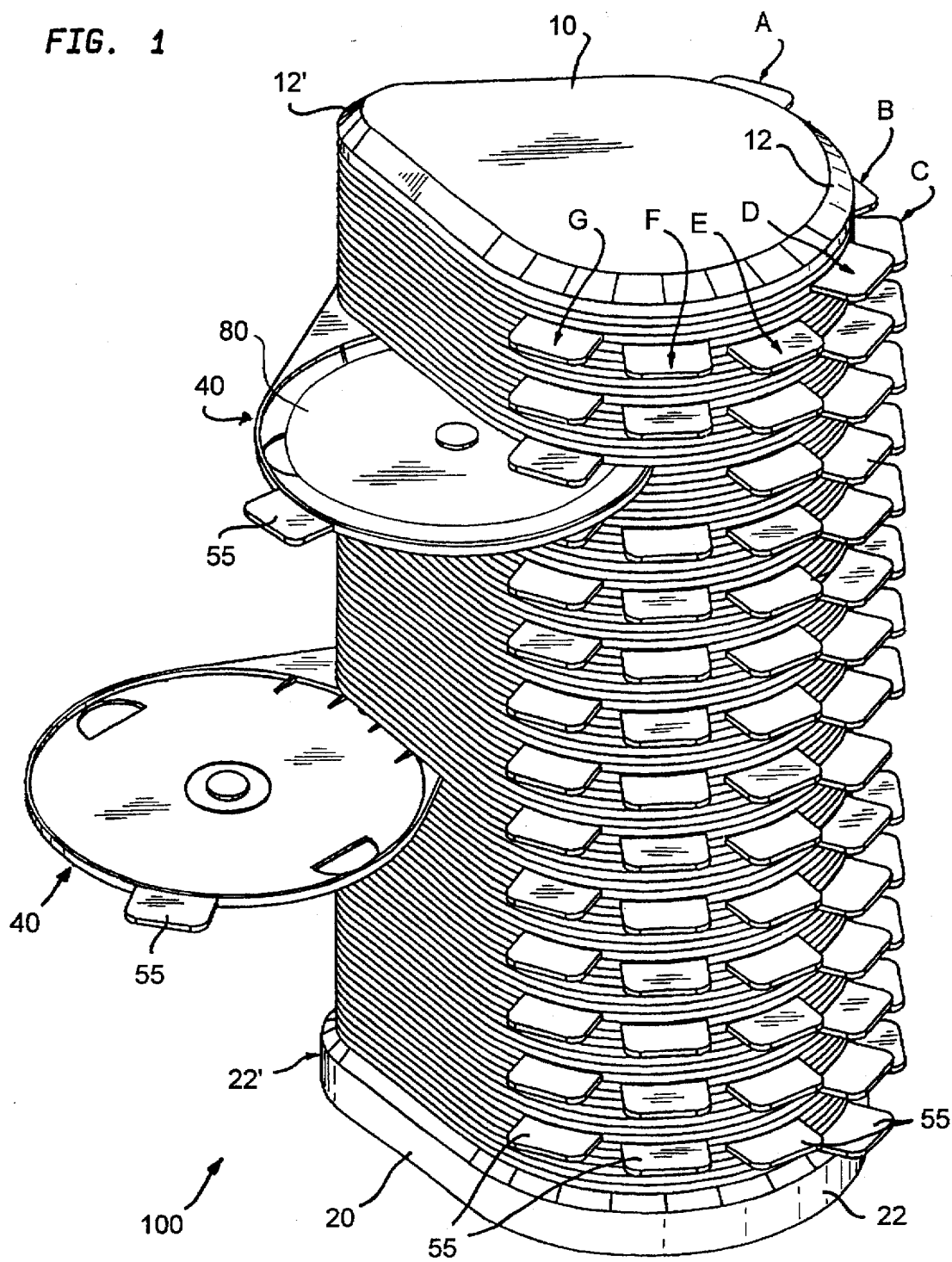
FIG. 1 is a perspective view of one embodiment of a storage rack according to the present invention for storing compact discs, with one tray being partially open and one tray being in fully opened position.

Throughout all the Figures, same or corresponding elements are generally indicated by same reference numerals.

Turning now to the drawing, and in particular to FIG. 1, there is shown a perspective illustration of a storage rack according to the present invention, generally designated by reference numeral 100 for storing flat disc-shaped data carriers 80, such as compact discs. The storage rack 100 has a main body in form of a stack of overlying support members 40 between a base 20 and a cover 10. Each support member 40 is formed with an outwardly jutting grip portion 55 for a user to grasp and swing the support member 40 between a protected closed position and an outward open position in which the stored compact disc can be removed or a compact disc can be placed. The grip portions 55 of the overlying support members 40 are suitably attached in staggered configuration to form groups that are designated by reference characters A, B, C, D, E, F, G. Thus, overlying grip portions 55 are sufficiently spaced apart from each other for easy grasping by a user. For illustrative purposes, FIG. 1 shows one support member 40 in a partially outwardly pivoted position and one support member 40 in fully open position.

Figure 2:
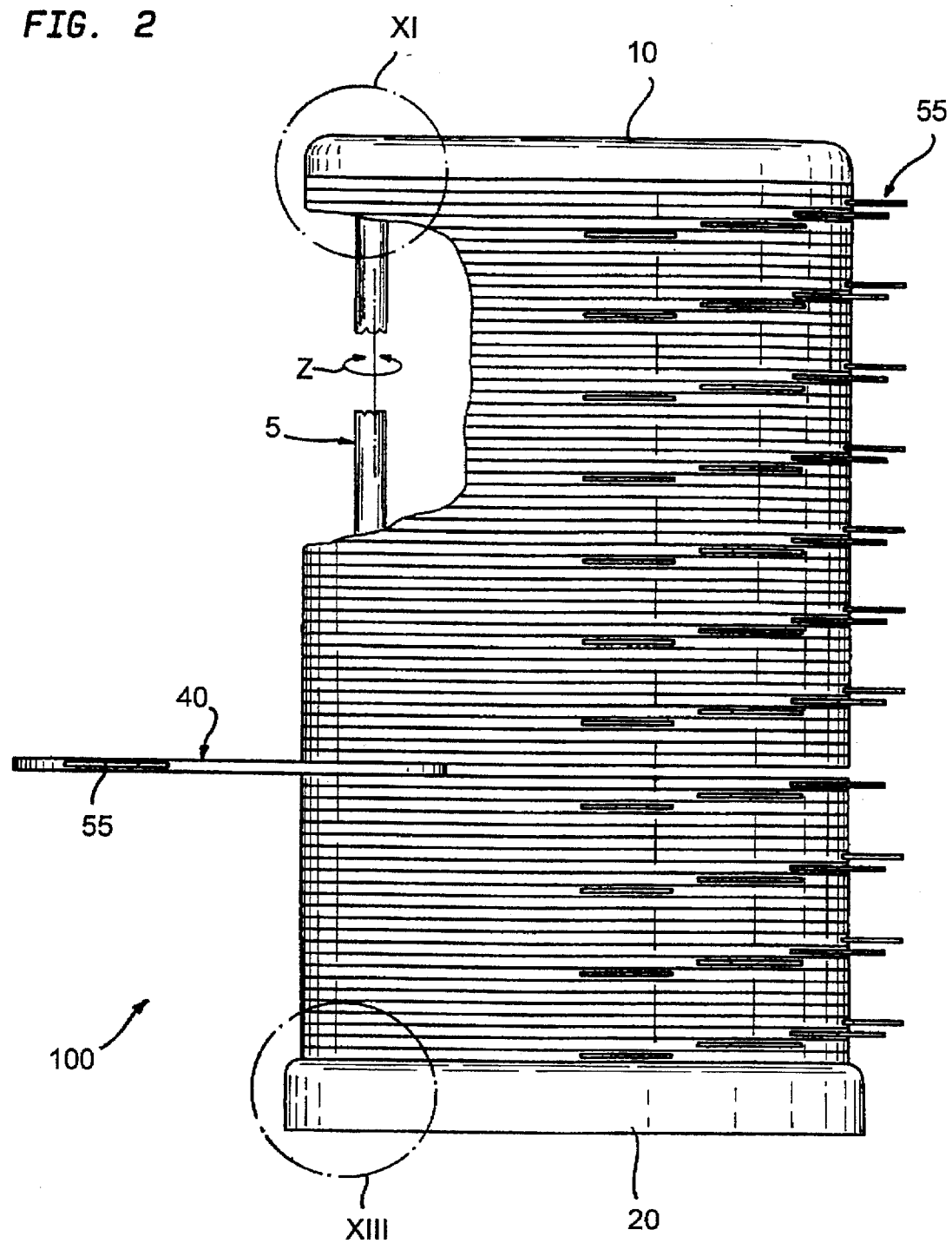
FIG. 2 is a side view of the storage rack of FIG. 1, with a portion thereof being broken away to show the interior thereof.

As shown in FIG. 2, the stack of support members 40 is traversed by a vertical rod 5 at an eccentric location between the cover 10 and the base 20. Each support member 40 is swingably mounted to the rod 5 so as to be pivotable in direction of the double arrow Z. Suitably, the pivoting of the support members 40 about the vertical rod 5 can be effected uniformly or indexed, as will be described further below. In free-standing arrangement, the support members 40 of the storage rack 100 can be swung about an angle of 360° to enable several support members 40 to be simultaneously accessible in open position. As shown in FIG. 3, an outward swinging of the support member 40 over an angle α of about 120° with respect to the axis of symmetry S is sufficient to place the support member 40 in open position for receiving or withdrawing a data carrier 80.

Figure 4:
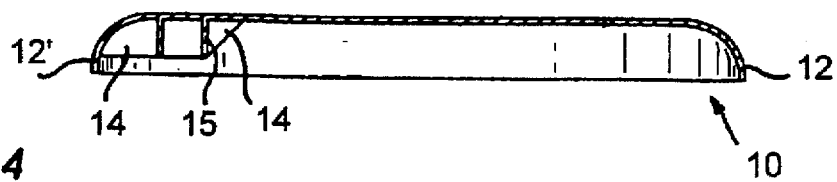
FIG. 4 is a sectional view of a cover for use on the storage rack of FIG. 1.
Figure 5:
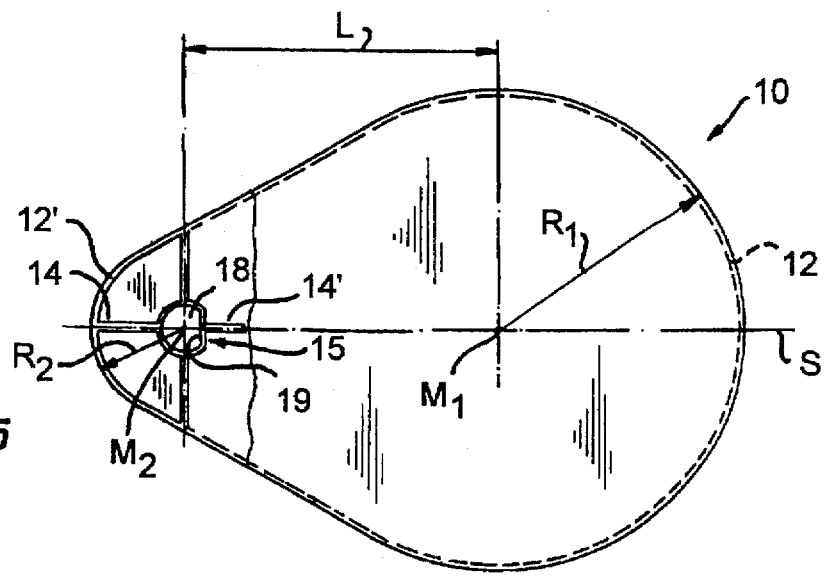
FIG. 5 is a partially sectional top view of the cover of FIG. 4.

Referring now to FIGS. 4 and 5, there are shown a sectional view and a partially broken away top view of the cover 10 which is of substantially drop-shaped configuration to exhibit an arcuated wall section 12 of relatively greater radius $R_1$ and center $M_1$ and an arcuated wall section 12' of smaller radius $R_2$ with center $M_2$. Suitably, as shown in FIG. 4, the border of the cover 10 extends downwardly to effect a smooth termination of the main body. Both centers $M_1$, $M_2$ are spaced from each other upon the imaginary axis of symmetry S by a distance L which is preferably selected of such magnitude as to exceed the length of the radius $R_1$ so that a tapered transition is formed from the arcuated wall section 12 in direction to the arcuated wall section 12'.

Formed integrally from the underside of the cover 10 in the area of the rear wall 12' is a sleeve 15 which is adapted to receive the upper end of the vertical rod 5 in form-fitting manner. The upper end of the rod 5 and the sleeve 15 are of complementary configuration, with coextensive flattened areas 19 to prevent a relative rotation therebetween. For reinforcement purposes, stiffening ribs 14 are spaced about the circumference of the sleeve 15 and extend from the sleeve 15 to the perimeter of the cover 10.

Figure 6:
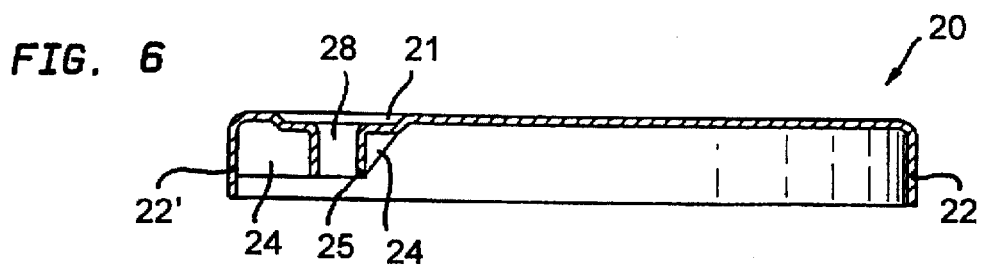
FIG. 6 is a sectional view of a base of the storage rack according to FIG. 1.
Figure 7:
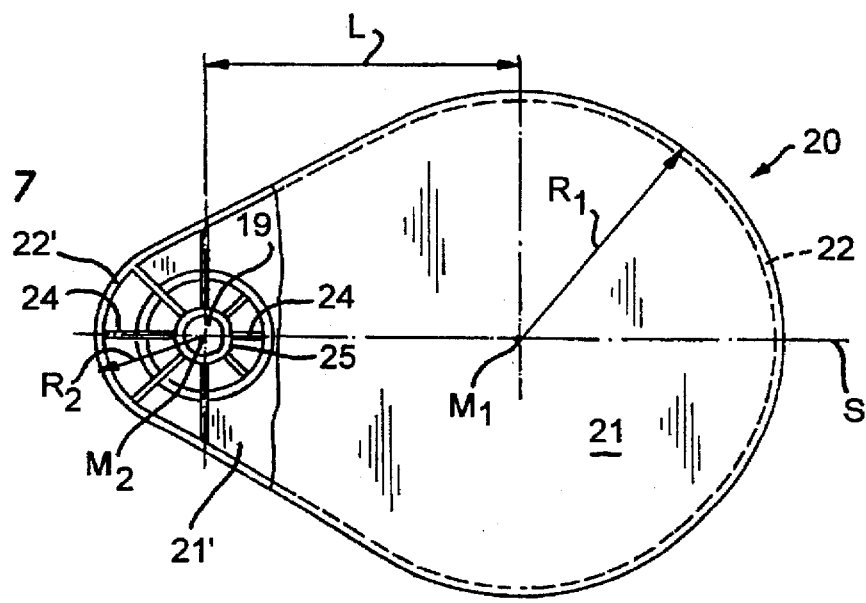
FIG. 7 is a partially sectional top view of the base according to FIG. 6.

FIGS. 6 and 7 show a sectional view and a partially broken away top view of the base 20 which is of similar drop-shaped configuration as the cover 10. The base 20 includes an arcuated wall section 22 of relatively greater radius $R_1$ and center $M_1$ and an arcuated wall section 22' of relatively smaller radius $R_2$ and center $M_2$, with distance L between the centers $M_1$ and $M_2$ being greater than the radius $R_1$ to form a tapered transition between the wall section 22 and the wall section 22' of the base 20. The border of the base 20 is angled downwards for placement of the storage rack 100 on the ground or other support surface.

In vicinity of the wall section 22', the base 20 is formed on its upper surface with a recess 21 which is connected to a sleeve 25 for receiving the lower end of the rod 5 in form-fitting manner. Suitably, the lower end of the rod 5 and the sleeve 25 are provided with coextensive flattened areas 19 to prevent a relative rotation therebetween. Formed about the sleeve 25 and evenly spaced about the circumference thereof are straight reinforcement ribs 24 which extend between the sleeve 25 and the perimeter of the base 20, on the one hand, and between the sleeve 25 and the perimeter of the recess 21, on the other hand, as shown in particular in FIG. 7.

Figure 8:
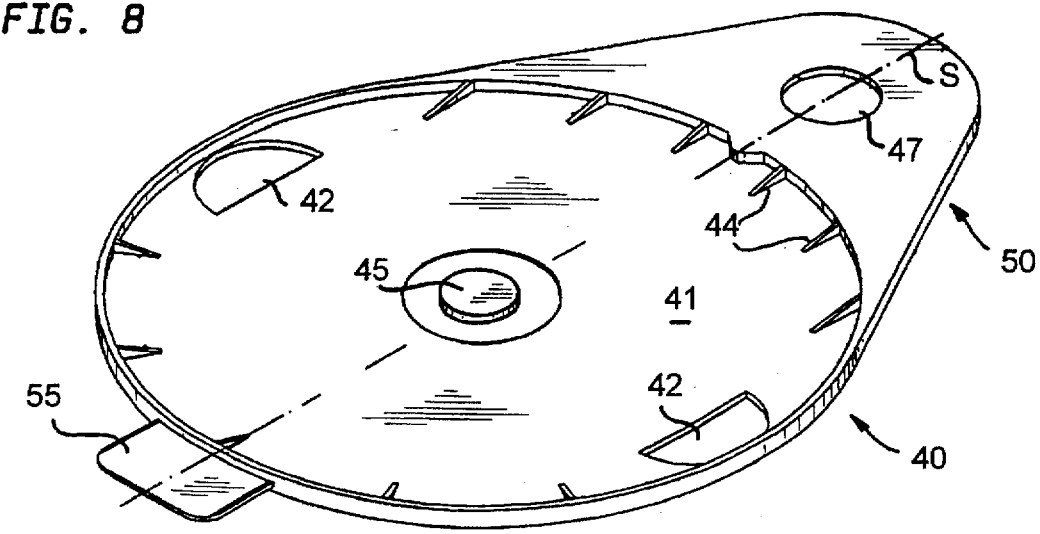
FIG. 8 is a perspective view of a support member forming part of the storage rack of FIG. 1.

Turning now to FIG. 8, there is shown a perspective view of the support member 40 for storing flat data carriers 80. The support member 40 includes a circular recessed tray 41 which is formed with a central circular mount 45 for engagement by the center hole (not shown) of the data carrier 80. The tray 41 is formed with two bores 42 at the outer perimeter for eased removal of a stored data carrier 80 from the tray 41 by enabling the user to insert for example the thumb and the middle finger of the hand through the bores 42. Extending inwardly from the circumferential wall and spaced about the perimeter of the tray 41 are ribs 44 for providing support for the data carrier 80. The tray 41 is rearwardly extended by a mounting part 50 by which the support member 40 is swingably mounted to the rod 5. The mounting part 50 includes a circular bore 47 which is traversed by the rod 5. To protect the tray 41 from penetration of dust particles, the tray 41 may be provided with a felt-like strip that is received in a circular circumferential groove (not shown) on the upper surface of the tray 41.

Figure 9:
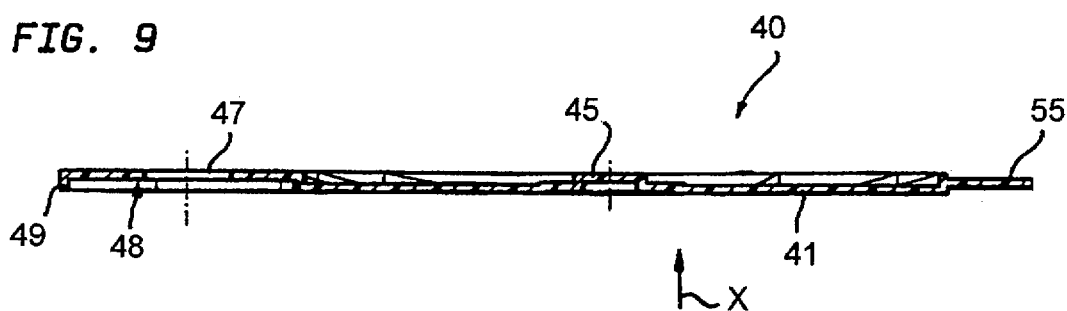
FIG. 9 is a sectional view of the support member of FIG. 8.
Figure 10:
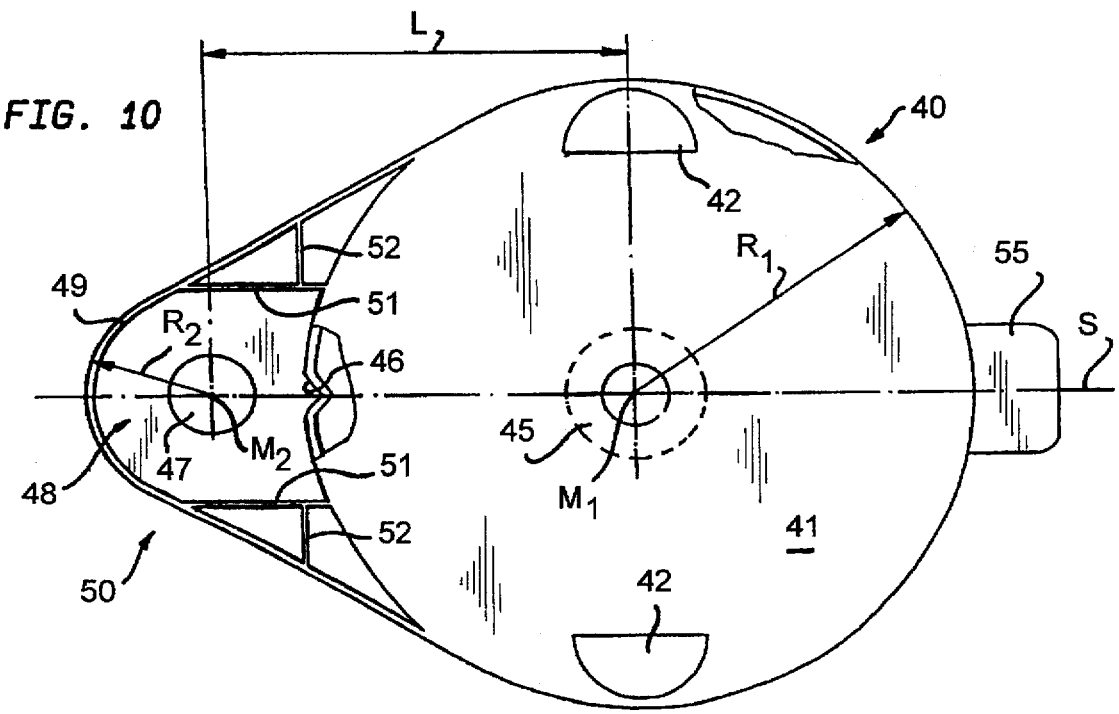
FIG. 10 is a bottom view of the support member taken in direction of arrow X in FIG. 9.

FIG. 10 shows the support member 40 from below in direction of arrow X in FIG. 9 and it can be see that the overall configuration of the support member 40 resembles the drop-shaped configuration of the bottom 20 and the cover 10 to thereby give the storage rack 100 a uniform appearance. The circular tray 41 is defined by radius $R_1$ and center $M_1$, and the mounting part 50 defines an arcuated wall section 49 that is defined by radius $R_2$ and center $M_2$, whereby the centers $M_1$, $M_2$ are spaced by distance L which exceeds the radius $R_1$, thereby forming the tapered transition between the tray 41 and the mounting part 50.

The mounting part 50 is suitably reinforced by ribs 51 which extend parallel to the axis of symmetry S and by ribs 52 which extend transversely to the axis of symmetry S. As further shown in particular in FIG. 9, the mounting part 50 of each support member 40 defines at the underside a cavity 48 which is bounded by the arcuate wall section 49 and the ribs 51 and receives a respective spacer 30.

As shown in FIG. 11, which is a sectional view of the storage rack 100, showing an enlarged detailed illustration of the circled area marked XI in FIG. 2, and in particular the area of the upper end of the rod 5, the spacers 30 are interposed between overlying support members 40 and are of substantially disk-shaped configuration, with a washer 6 being placed between the uppermost spacer 30 and the adjacent sleeve 15. Each spacer 30 includes a hub 34 which is formed with a rectilinear flattened area 33 in form-fitting engagement with the complementary flattened area 19 of the rod 5. As best seen in FIG. 12, the rod-distal side of the flattened area 33 is connected to a spring element 31 of C-shaped configuration to exhibit two arcuated spring arms. The spring element 31 is formed with a central catch 32 that projects outwardly for engagement in a notch 46 (FIG. 10) at the underside of the mounting part 50 of the support member 40. In the closed position of the support member 40, i.e. in the position in which the tray 41 is inside the stack, the catch 32 of the spring element 31 engages the notch 46 at the perimeter of the tray 41. When swinging the support member 40 outwards to expose the tray 41, the spring element 31 gives way to allow the catch 32 to disengage from the notch 46 and to release the support member 40.

Formed about the arcuated section of the hub 34 are three arms 35 which are spaced from each other by 90°. Positioned between neighboring arms 35 is a wing-like member 38 such that a gap 37 is formed between the wing-like member 38 and the neighboring arm 35. The hub-distal end of the arms 35 is enlarged to define a nose 35' so that the three arms 35 effect a three-point bearing upon the mounting part 50 of the subjacent support member 40, with a slight gap 39 being formed between the arms 35 and the mounting part 50 of the support member 40. The wing-like members 38 carry the support member 40 that is arranged above the spacer 30 and are slightly vertically extended with regard to the arms 35 so that a gap is also formed between the inside of the mounting part 50 and the upper surface of the arms 35.

FIG. 13 shows a sectional view, on an enlarged scale, of the circled area marked XIII in FIG. 2, and depicts in detail the attachment of the lower end of the rod 5 to the base 20 via a screw fastener 9 which is threadably engaged from below into the end of the rod 5 that is received in the sleeve 25. Suitably a washer 8 is interposed to improve the tightness of the screw fastener 9. A plate-shaped insert 4 is placed in the recess 21 to secure the lowermost spacer 30 in place. The screwed connection may also be used to effect a bracing of the support members 40 with the interposed spacers 30.

Referring now to FIG. 14, it can be seen that the grip portion 55 of each support member 40 is enveloped by a replaceable cap 60 which is suitably made of transparent plastic material, and as shown by the sectional view of FIG, 14a of substantially U-shaped configuration. Extending inwardly from opposing inside surfaces of the plastic cap 60 are catches 66 which are engageable in complementary notches 56 of the grip portion 55. When being placed over the grip portion 55, the tray-proximal end of the cap 60 conforms to the contour of the tray 41. For manufacturing purposes and improved handling of the grip portion 55, the cap 60 is preferably formed with a circular opening 64 on its underside.

The grip portion 55 may form an integral part of the tray 41, or may be attached to the tray 41 in such a manner that the position of the grip portion 55 can be adjusted about the perimeter of the tray 41, whereby the displacement of the grip portion 55 may be effected continuously or also indexed so as to attain the staggered configuration as shown in FIG. 1. A nonlimiting example for a selective disposition of the grip portion 55 relative to the tray 41 is shown in FIG. 14b, with the tray 41 being formed about its circumference with spaced slots 55' for insertion of the grip poriton 55. Also, it is certainly within the scope of the present invention to provide an assembly by which the grip portions are plugged onto the trays 41. The grip portions 55 may be used for inscription of title or other data on the caps 60.

Suitably, the support members 40 are made of plastic material through extrusion and colored in groups to better distinguish them from one another. Their integration within the storage rack 100 can be suited to the customer's needs.

FIG. 15 shows a variation of the mounting part 50 in which the catch 32 of the spring element 31 of the spacer 30 cooperates for engagement in a total of four notches 46 which are spaced from each other by 90°, with notches 46 being formed, in addition to the notch 46 exhibited in the tray 41, in the ribs 51 that parallel the axis of symmetry S and in the rib 52 that extends between the ribs 51 transversely to the axis of symmetry S. Thus, the swinging motion of the support members 40 relative to the stationary spacers 30 is indexed in steps of 900, with the resiliently supported catch 32 respectively entering and retracting from the notches 46.

From the previous description, it is evident that the rod 5 is of such a configuration to prevent a rotation relative to the sleeves 15, 25 and the hubs 34 of the spacers 30 while still allowing a rotation of the support members 40. Persons skilled in the art will understand that the described flattened areas to prevent the relative rotation between the sleeves and the spacers are shown only by way of example, and may be substituted by other configurations, e.g. complementary polygonal configuration of the rod, on the one hand, and the sleeves and hubs, on the other hand.

Figure 16:
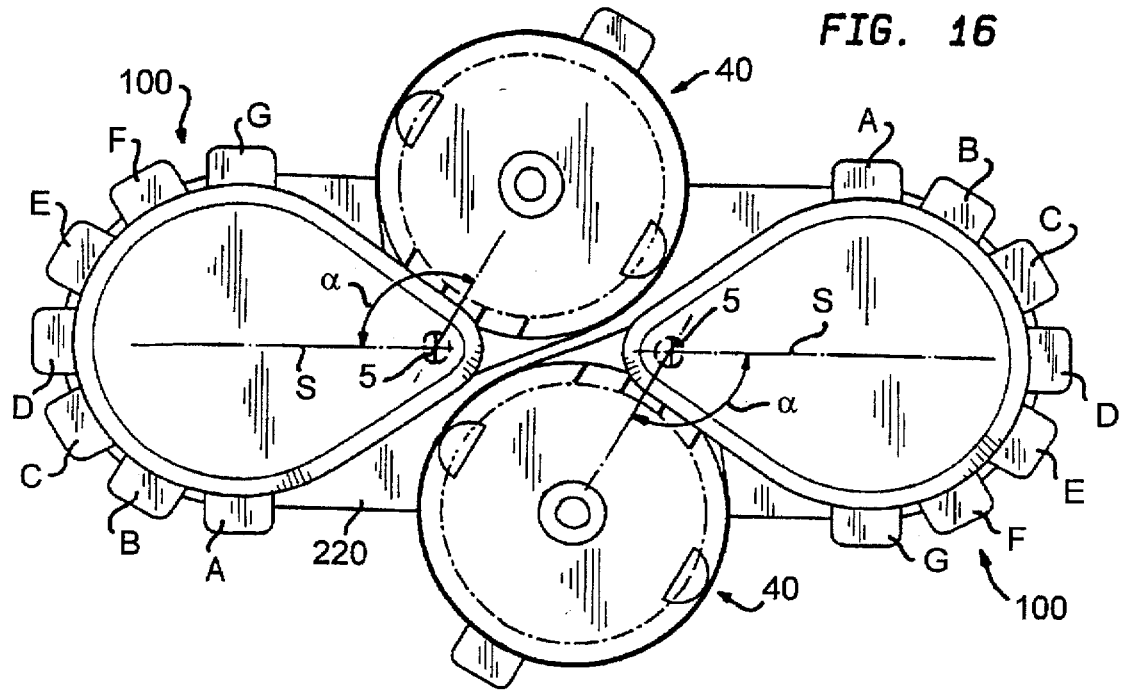
FIG. 16 is a schematic top view of an assembly comprised of two storage racks according to the present invention.

The storage rack 100 according to the present invention is characterized by a great versatility. For example, as shown in FIG. 16, two like storage racks 100 can be mounted with their bases 20 on a ground plate 220 in opposite arrangement, with their substantially pointed end facing each other. The attachment of the bases 20 to the ground plate 220 may be effected in a manner shown in FIG. 13, i.e. by threadably engaging a screw fastener from below the bottom plate into the lower end of the rod 5. The trays 41 can be swiveled outwards about an angle $\alpha$ of about 120°. Persons skilled in the art will understand that the attachment of the storage rack 100 onto the ground plate 220 may certainly be effected by other means, e.g. via spring-elastic snap-in elements which are formed on the base 20 and engage complementary elements on the ground plate 220.

Figure 17:
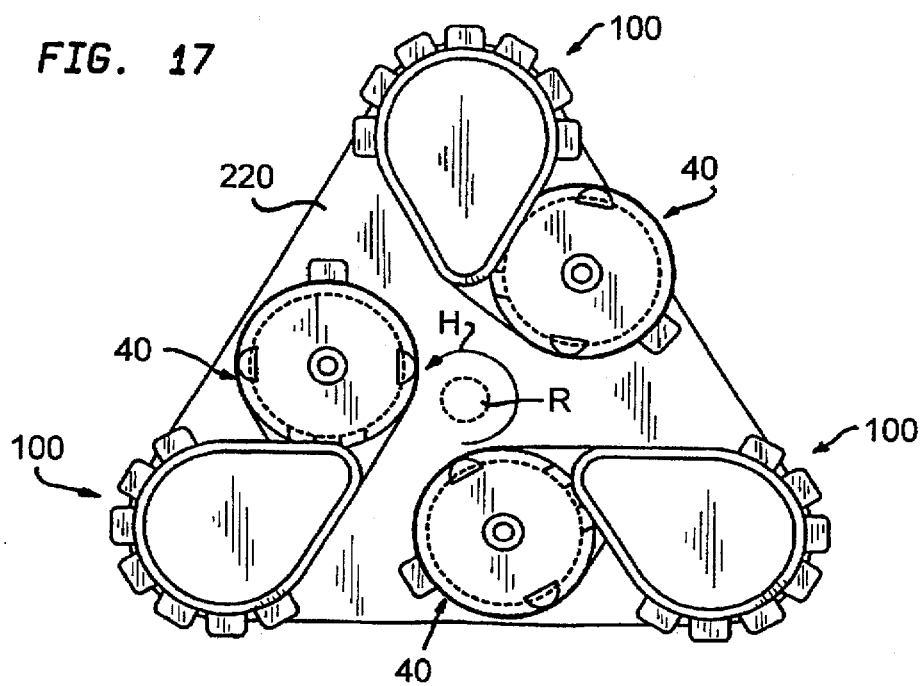
FIG. 17 is a schematic top view of an assembly comprised of three storage racks according to the present invention.

FIG. 17 shows an arrangement of three storage racks 100 according to the present invention upon a ground plate 220 of triangular configuration with the storage racks 100 being positioned at the corners of the triangle. This assembly may be placed upon a carousel so as to be turnable in direction of arrow H about an axis of rotation R formed by a vertical post.

Figure 18:
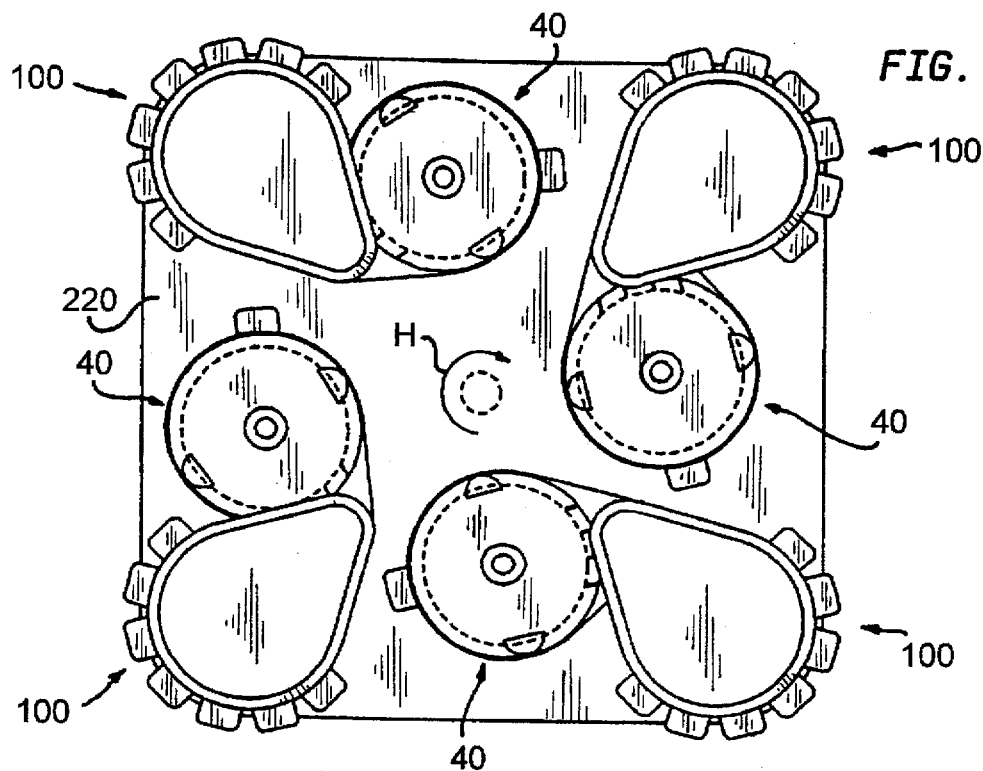
FIG. 18 is a schematic top view of an assembly comprised of four storage racks according to the present invention.

FIG. 18 shows an arrangement of four storage racks 100 according to the present invention upon a ground plate 220 of square configuration with the storage racks 100 being positioned at the corners of the square. This assembly may also be placed upon a carousel so as to be turnable in direction of arrow H about an axis of rotation R.

Figure 19:
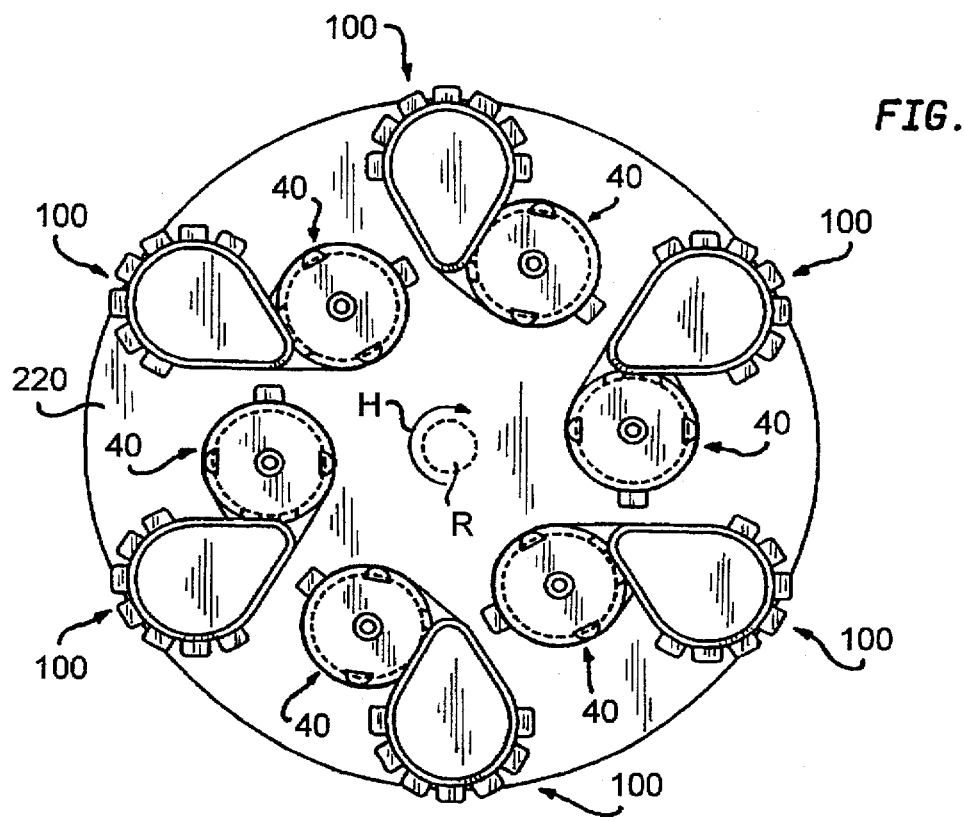
FIG. 19 is a schematic top view of an assembly comprised of six storage racks according to the present invention mounted on a circular ground plate.

FIG. 19 shows an arrangement of six storage racks 100 according to the present invention upon a ground plate 220 of circular configuration with the storage racks 100 being evenly spaced about the perimeter of the ground plate 220. This assembly may also be placed upon a carousel so as to be turnable in direction of arrow H about an axis of rotation R.

The distance between the individual storage racks 100 upon the bottom plate 220 may be selected in such a manner that the tray 41 of the support members 40 can be swiveled outwards at least by an angle α of about 120° in horizontal direction.

While the invention has been illustrated and described as embodied in a storage device for flat objects, it is not intended to be limited to the details shown since various modifications and structural changes may be made without departing in any way from the spirit of the present invention.

What is claimed as new and desired to be protected by Letters Patent is set forth in the appended claims.

I claim:

1. A storage device for flat objects, comprising:

a main body having a base for placement on a surface and a top, said main body being defined by an axis; and a cover placed upon the top of the main body, said main body being formed by a stack of overlying support members and including a vertical rod which extends at a distance to the axis between the cover and the base, each of said support members being formed by a tray for storing a flat object and an eccentric mounting part secured to the tray and swingably mounted to the rod for swinging a the support member in a substantial horizontal direction between a protected closed position and an open position in which the tray of each support member is accessible for depositing or removal of a flat object, each said tray having a notch, wherein overlying support members of the stack are distanced from each other by disk-shaped spacers which are mounted to the rod and formed with a resilient catch, each of the mounting parts having an underside exhibiting a pocket for receiving one such spacer, with the catch being engageable in the notch of the tray.

2. The storage device of claim 1 wherein each tray is of substantially circular configuration defined by a first center and each mounting part exhibits an arcuated wall segment defined by a second center which is traversed by the rod and spaced from the first center by a distance.

3. The storage device of claim 2 wherein the base and the cover are of a configuration resembling the configuration of each support member.

4. The storage device of claim 2 wherein each tray is defined by a radius of a length which is exceeded by the distance between the first center and the second center.

5. The storage device of claim 2 wherein each support member is of substantially drop-shaped configuration with a tapered transition between each tray and each mounting part.

6. The storage device of claim 1 wherein the underside of each mounting part is formed with a notch in opposition to the notch of each tray and with two further notches in opposition to each other for indexed engagement by the catch of the respective spacer, with the notch of each mounting part and the notch of each tray being arranged in symmetry to each other.

7. The storage device of claim 1 wherein each spacer includes a hub fixedly secured to the rod, a spring element formed on the hub and exhibiting the catch, a first group of three arms projecting radially from the hub and spaced from one another about the circumference of the hub by 90°, and a second group of two wing-like members respectively positioned between two neighboring arms of the first group.

8. The storage device of claim 7 wherein each spring element is a single piece formed integrally with the hub, each said spring element being provided in form of two arcuated spring arms connected to each other, with the catch being formed centrally thereon.

9. The storage device of claim 7 wherein each arm of the first group of three arms is formed at a side facing each mounting part with a projection for effecting a three-point bearing upon a subjacent support member.

10. The storage device of claim 7 wherein the wing-like members carry each mounting part of each support member arranged above the spacer.

11. The storage device of claim 1 wherein each support member is swingable in indexed manner about the rod between the closed and open positions.

12. The storage device of claim 1 wherein each support member is swingable about an angle of 360°.

13. The storage device of claim 1 wherein the support members are each formed with a grip portion for facilitating a pivoting of the support member between the closed and open positions.

14. The storage device of claim 13 wherein the grip portion of each support member is adjustably secured to the support member.

15. The storage device of claim 1 wherein the main body and the cover form a structural unit for assembly with another like structural unit upon a common ground plate.

16. The storage device of claim 15 wherein the support members of each structural unit can be separately and independently swung in the horizontal direction.

17. The storage device of claim 15 wherein the ground plate is of rectangular configuration with opposing ends being rounded.

18. The storage disk of claim 15, and further comprising a vertical post secured to the ground plate, said structural units being placed on the ground plate for rotation about the vertical post.

19. The storage device of claim 15 wherein the ground plate is of triangular configuration exhibiting rounded corners.

20. The storage device of claim 15 wherein the ground plate is of square configuration exhibiting rounded corners.

21. The storage device of claim 15 wherein the ground plate is of circular configuration.

\* \* \* \* \*